(No Model.)
J. A. HOEDEMAKER & G. W. O'HARRA.
PHOTOGRAPHIC SHUTTER.
No. 340,213. Patented Apr. 20, 1886.
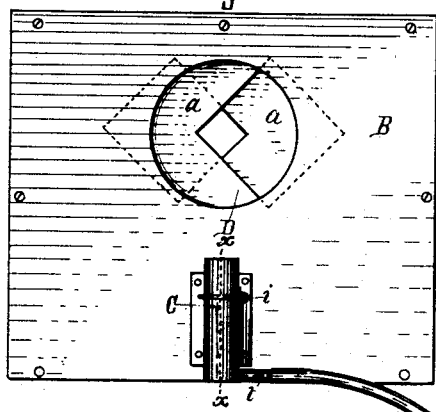
Fig. 1
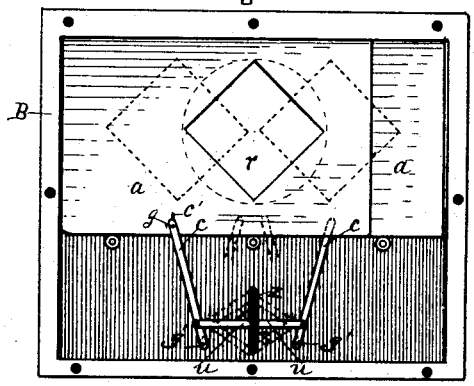
Fig. 2
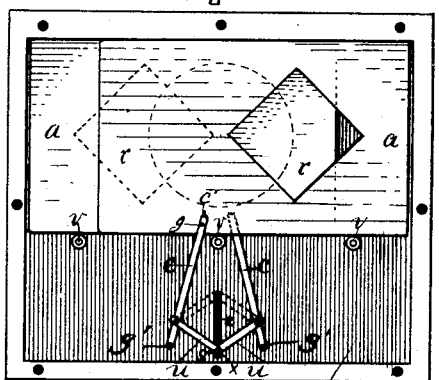
Fig. 3
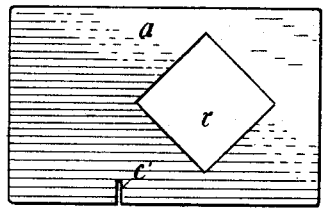
Fig. 4
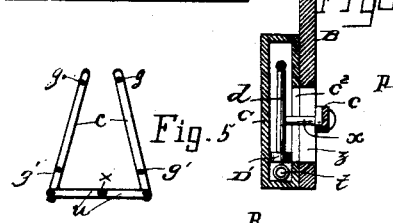
Fig. 5
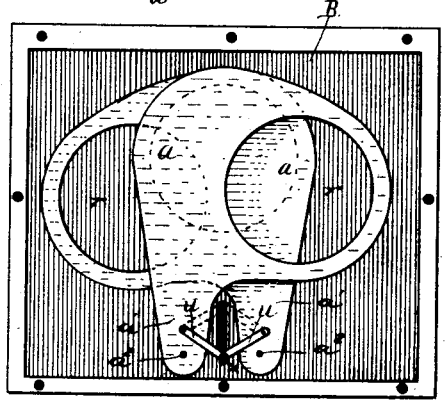
Fig. 6
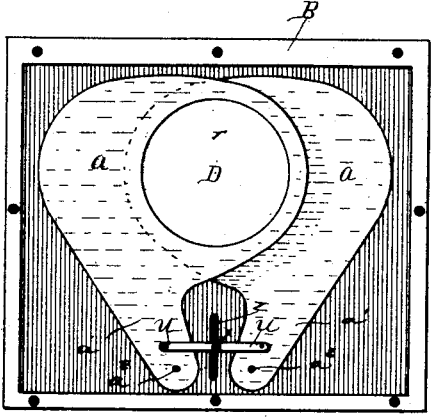
Fig. 7
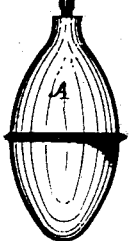
Witnesses.
John C. Perkins
Cullen C. Packard
Inventors
John A. Hoedemaker
George W. O'Harra
N. PETERS, Photo-Lithographer, Washington, D. C.

UNITED STATES PATENT OFFICE.

JOHN A. HOEDEMAKER AND GEORGE W. O'HARRA, OF KALAMAZOO, MICHIGAN, ASSIGNORS OF ONE-HALF TO DANIEL O. ROBERTS AND FRANK S. HILLHOUSE, BOTH OF SAME PLACE.

PHOTOGRAPHIC SHUTTER.

SPECIFICATION forming part of Letters Patent No. 340,213, dated April 20, 1886.

Application filed August 10, 1885. Serial No. 173,975. (No model.)

*To all whom it may concern:*

Be it known that we, JOHN A. HOEDEMAKER and GEORGE W. O'HARRA, citizens of the United States, and residents of Kalamazoo, county of Kalamazoo, State of Michigan, have invented a new and useful Improvement in Photographic Shutters; and we do hereby declare that the following is a full, clear, and exact description of the invention, which will enable others skilled in the art to which it appertains to make and use the same.

Our invention has relation to photographic shutters and cameras; and the novelty consists of the peculiar construction and combination of parts, substantially as hereinafter fully set forth, and specifically pointed out in the claims.

The primary object of our invention is to provide means whereby the lens-tube of a photographic camera can be instantaneously exposed or concealed; to provide means whereby it can be exposed to an object for a limited period of time, this arrangement being especially adapted for indoor work, while the instantaneous arrangement above noted is especially adapted for outdoor work.

A further object of our invention is to provide means which shall be capable of ready application to a camera, and which will be very simple, light, and durable in construction, thoroughly effective for the purposes designed, and under immediate control of the operator.

In the annexed drawings, Figure 1 is a front elevation of our improvement, showing the shutters partly thrown open and the means for operating the same. Fig. 2 is a rear elevation looking into the chamber of the inclosing-casing and the shutters thrown open to completely expose the lens-tube of a camera. Fig. 3 is a similar view with the shutters closed. Fig. 4 is a detail detached view in elevation of one of the shutters. Fig. 5 is a detail view of a modification of the toggle-levers. Figs. 6 and 7 are views in rear elevation looking into the chamber of the inclosing-case and showing another form of shutters in their open and closed positions; and Fig. 8 is a vertical sectional view on the line $x\ x$ of Fig. 1, taken through the air-cylinder, and showing the connection between the lever-operating pin and piston.

Referring to the drawings, in which like letters of reference indicate corresponding parts in all the figures, B designates the inclosing-case of our invention, which is adapted to be attached in any suitable manner to the front of the photographic camera, and having a front wall, $b$, provided with an opening, D, which is adapted to register with the lens-tube of the camera when the case B is adjusted and secured thereon.

Referring more particularly to Figs. 1, 2, 3, and 4 of the drawings, $a\ a$ designate two shutters arranged within the chamber of the inclosing-case and immediately in rear of the front wall thereof. The shutters or slides are arranged one in rear of the other and move in horizontal planes in opposite directions, so that openings $r$, provided therein, shall register with each other, either wholly or only partially so, and with the opening D of the inclosing-case and the lens-tube of the camera. The shutters are mounted so as to slide or move freely on friction-rollers V, which are journaled on suitable pins or shafts secured in the front wall of the inclosing-case. (See Figs. 2 and 3.) The front wall of the inclosing-case is provided with a vertical slot, $z$, near or at its middle and the lower edge, as clearly shown, and in this slot works a vertically-movable pin, $x$, which is connected at one end to a rod, $d$, of a piston, D', which is arranged in a cylinder, C. This cylinder C is provided with lateral flanges $c$, for securing it to the outer face of the front wall of the inclosing-case, and the rear wall of said cylinder is slotted, as at $c^2$, which slot opens into or communicates with the slot $z$ of the inclosing-case, the pin $x$ passing through and free to move vertically in said slots. (See Fig. 8.) The lower edge of each of the shutters $a$ is slotted, as at $c'$, and in the slot of each shutter works a pin, $g$, which is rigidly secured in the upper end of a lever, $e$, one of which is provided for each shutter. The lower end of each lever $e$ is pivoted to the front wall of the inclosing-case B, as at $g'$, near the lower end of the slot $z$ therein, and to these levers $e$ are pivoted toggle levers or links $u$. These toggle-levers are pivoted at one end on and carried by the movable pin $x$, and at their opposite ends they are pivoted to the lever $c$ at a point above their pivots $g'$, (see Figs. 2 and 3;) but we do not desire to confine ourselves to this particular arrangement as the point of pivot-connection of the levers $u$ with the levers $c$, as they can be placed below the pivots $g'$, as shown in Fig. 5, and secure the same result. The lower end of the air-cylinder C has a short rigid nozzle or pipe-section, $t$, which opens into the same, and to this nozzle $t$ is connected a flexible pipe, P, the free end of which carries an elastic bulb, A, which is grasped and compressed by the operator when it is desired to operate the shutters.

The operation of our invention is obvious. When it is desired to open the shutters instantaneously, (which are normally open to expose the lens-tube of the camera to which the device is adjusted,) the operator compresses the elastic bulb A, which forces a current of air through the pipe or tube P beneath the piston D', which is elevated together with its rod $d$ and the pin $x$, which latter elevates the inner ends of the toggle-levers to move the levers $c$ on their pivots and simultaneously force the shutters $a\,a$ apart, to cause the openings to be thrown out of coincidence and conceal the end of the lens-tube.

When the device is used to expose the lens-tube for a limited time, a pin, $i$, is inserted in the openings in the cylinder C, to prevent the upward movement of the piston therein and so as to hold the pin $x$ midway in the slots, as shown, and when the time has expired the pin is withdrawn and the piston forced upward to the ends of the slots to close the shutters.

In the modification shown in Figs. 6 and 7 of the drawings the shutters $a$ are provided with lateral enlargement, which have the openings $r$, and at their lower ends they have lugs or arms $a'$, that are pivoted to the front wall of the casing, as at $a^2$. In this construction we dispense with the levers $c$ and pivot one end of the levers $u$ to the lugs $a'$ of the shutters, while the other ends of the said levers are pivoted to the pin $x$, which is connected to and operated by the piston and the bulb A. When the air is compressed in the bulb A, it forces the piston upwardly, which carries the pin $x$ and the inner ends of the levers $u$ to the upper end of the slots and causes the shutters to move in their pivots and the openings $r$ therein to register with each other and the lens-tube and opening D.

We are aware that it is not broadly new to provide a camera with shutters which are operated simultaneously and in opposite directions to expose and conceal the lens-tube of said camera.

Having thus described our invention, what we claim as new, and desire to secure by Letters Patent, is—

1. The combination of the apertured shutters movable simultaneously and laterally toward and from each other to throw the openings into and out of alignment, a cylinder, a movable piston having a laterally-projecting pin, intermediate toggle-levers connecting the movable shutters and pin, for operating the former when the latter is moved, and means for operating the piston and its pin, substantially as described.

2. The combination of the horizontally-sliding apertured shutters movable laterally with respect to each other, an air-cylinder, a reciprocating piston provided with a pin, toggle-levers connecting each of the shutters with the pin of the piston, a supply-pipe entering the cylinder beneath the piston, and an elastic bulb, substantially as described.

3. The combination of the laterally and simultaneously movable shutters having openings, an air-cylinder, a reciprocating piston therein provided with a pin, pivoted levers $c$, connected with the shutters, levers $u$, pivoted to the levers $c$, and carried by the movable pin of the piston, flexible supply-pipe, and an elastic pressure-bulb fitted on the free end of the said pipe, substantially as described.

JOHN A. HOEDEMAKER.
GEORGE W. O'HARRA.

Witnesses:
JOHN C. PERKINS,
CUELEN C. PACKARD.